United States Patent [19]
Abos

[11] 3,734,036
[45] May 22, 1973

[54] PROCESS FOR DISPOSAL OF COMBUSTIBLE WASTE

[75] Inventor: Ramon L. Abos, Ypsilanti, Mich.

[73] Assignee: Hoad Engineers Incorporated, Ypsilanti, Mich.

[22] Filed: Mar. 30, 1972

[21] Appl. No.: 239,486

[52] U.S. Cl..................................110/8 R, 110/15
[51] Int. Cl................................................F23g 5/04
[58] Field of Search........................110/8 R, 10, 15, 110/119; 122/2

[56] References Cited
UNITED STATES PATENTS

| | | | |
|---|---|---|---|
| 2,148,447 | 2/1939 | Dundas et al | 110/15 |
| 2,213,668 | 9/1940 | Dundas et al | 110/15 |
| 3,482,533 | 12/1969 | Ankersen | 110/8 |
| 3,670,669 | 6/1972 | Hoad | 110/8 |

Primary Examiner—Kenneth W. Sprague
Attorney—Olsen & Stephenson

[57] ABSTRACT

Combustible waste material is collected and processed into fuel after which the fuel is disposed of by incineration, the energy derived from combustion being utilized to convert additional waste material into fuel. Included in the process are the steps of shredding the waste material and passing the shredded material through a heating chamber wherein the waste material is contacted by hot exhaust gases at about 800°F from a combustion chamber to convert the shredded material to a charcoal-like fuel, conveying the fuel to a storage chamber, fluidizing and feeding the fuel to the combustion chamber, and incinerating the same to produce hot exhaust gases of about 1500°F, passing a sufficient portion of the hot exhaust gases to the heating chamber as make-up gases to maintain at about 800°F the temperature of the gases contacting the shredded material, and returning to the combustion chamber from the heating chamber a corresponding portion of discharge gases.

15 Claims, 1 Drawing Figure

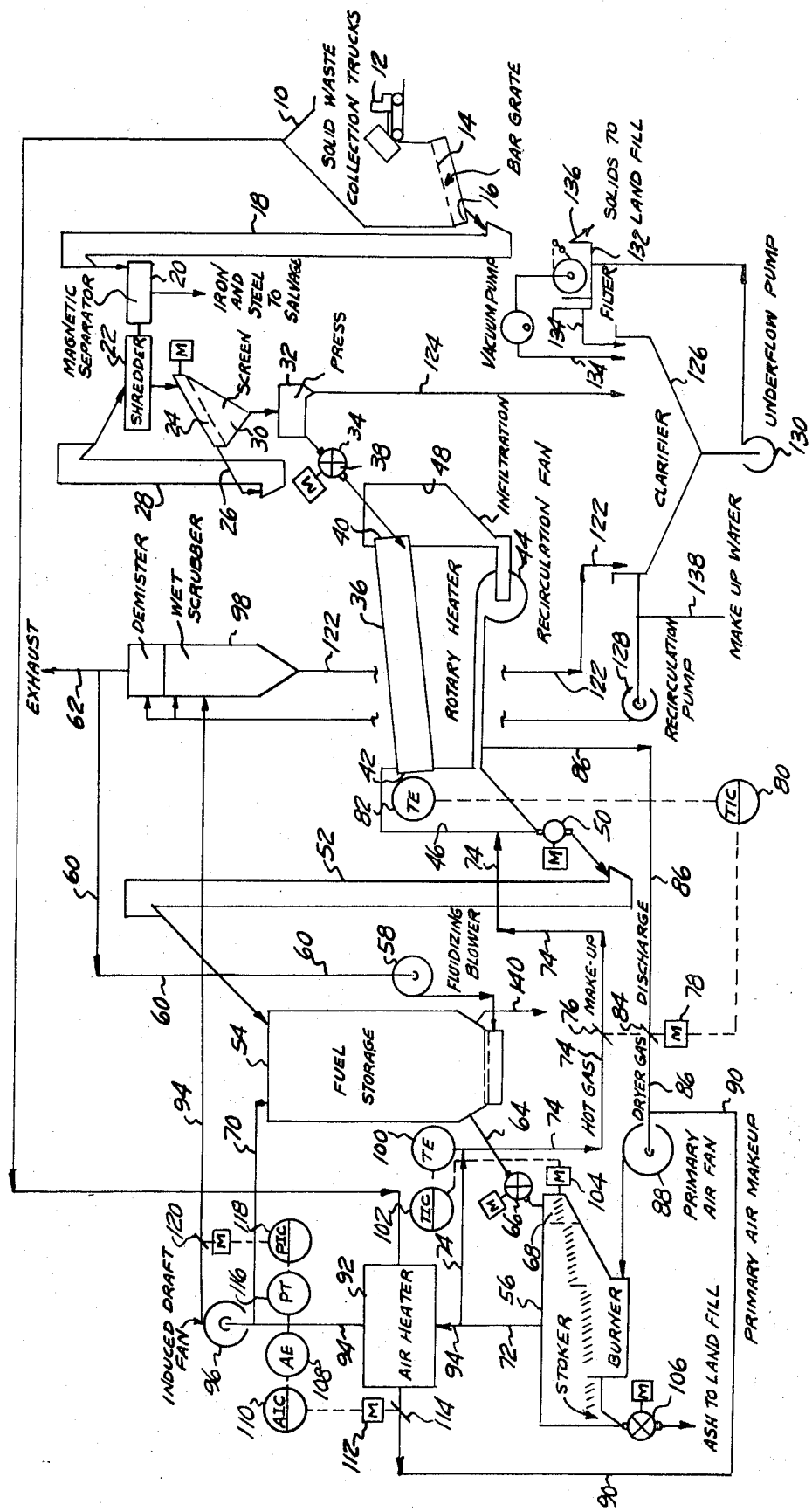

PROCESS FOR DISPOSAL OF COMBUSTIBLE WASTE

CROSS-REFERENCE TO RELATED APPLICATION

The present invention relates to the process disclosed in pending application, Ser. No. 98,559, now U.S. Pat. No. 3,670,669, filed Dec. 16, 1970 in the name of John G. Hoad and assigned to the assignee of this application.

BACKGROUND OF THE INVENTION

The present invention relates to an improved process for solid waste disposal and energy conversion.

The process disclosed in the aforesaid pending application, Ser. No. 98,559 provides an improved process for disposing of solid waste wherein the solid waste is processed so that optimum incineration of the solid matter and the malodorous gases is realized, and the processing of the solid matter is such so that it can be efficiently utilized during incineration to supply heat energy for the production of electricity, thus realizing an economic return from the incineration operation. To fully realize the benefits of this process an electric generator plant must be associated with the waste disposal apparatus, thus limiting the extent of use of the process. There remains a significant need for improved practices for the disposal of solid waste which can be carried out in the absence of demands for electrical energy.

SUMMARY OF THE INVENTION

The present invention provides an improved process for disposing of solid waste wherein solid waste is processed to form a charcoal-like fuel which can be incinerated at a controlled rate to provide heat energy to be used in the production of additional fuel from the source of solid waste. Thus, the energy derived from the fuel is used in the production of additional fuel so as to provide an efficient, low cost incineration system.

According to one form of the present invention, a process is provided for the disposal of combustible solid waste comprising the steps of shredding the solid waste to obtain shredded material, feeding the shredded material through a high-density press and compressing the same to remove liquids from the material, passing the shredded material downstream through a heating chamber in heat-transfer relation to hot gases circulated countercurrent to the shredded material to convert the shredded material to a charcoal-like fuel, conveying the fuel to a storage chamber, fluidizing and feeding the fuel from the storage chamber into a combustion chamber and incinerating the same at a rate to produce hot exhaust gases at a temperature of about 1500°F, passing a sufficient portion of said hot exhaust gases to said heating chamber as make-up gases to maintain at about 800°F the temperature of gases in the heating chamber at the downstream end of the shredded material, returning to said combustion chamber from the upstream end of the shredded material a corresponding portion of discharge gases, ventilating said enclosure, discharging gases from the ventilated enclosure into said combustion chamber as the primary source of air for combustion of said fuel, treating the remainder of said hot exhaust gases to remove particulate matter and to lower the temperature thereof, and returning a portion of the treated gases to said storage chamber for fluidizing the fuel.

Thus, it is an object of the present invention to provide an improved solid waste disposal system.

Other objects of this invention will appear in the following description and appended claims, reference being had to the accompanying drawings forming a part of this specification wherein like reference characters designate corresponding parts in the several views.

BRIEF DESCRIPTION OF THE DRAWING

The drawing is a schematic diagram illustrating an arrangement suitable for carrying out the process of the present invention.

DESCRIPTION OF THE PREFERRED EMBODIMENT

Before explaining the present invention in detail, it is to be understood that the present invention is not limited in its application to the details of construction and arrangement of parts illustrated in the accompanying drawing since the invention is capable of other embodiments and of being practiced or carried out in various ways. Also, it is to be understood that the phraseology or terminology employed herein is for the purpose of description and not of limitation.

Referring now to the drawing, the apparatus schematically shown for carrying out the process of the present invention will be described. A ventilated collection enclosure 10 is shown which is adapted to receive from collection trucks 12, or the like, a variety of solid waste materials which may be industrial or municipal wastes, both moist and dry. The waste will be deposited initially upon a bar grate 14 for separating any large metallic or non-combustible materials while permitting the remaining combustible and wet materials to descend through the bar grate to the sump portion 16 from which it can be transmitted by means of suitable conveying apparatus through a passageway 18 to a magnetic separator 20 for separating magnetic particles. After being processed through the magnetic separator 20 the combustible solid waste material is conveyed to the shredder 22 where the solid waste material is shredded to obtain shredded material of a uniform, maximum size. The shredded material is deposited on a closed circuit screen 24 through which the shredded material of the uniform, maximum size can pass onto a conveyor 26, and any shredded material which is above the desired maximum size will be recycled via the passageway 28 to the shredder 22 for reshredding to assure that material of the maximum size only is passed through the sump 30 to the high-density press 32.

The high-density press 32 can be any suitable press, such as of the type used in the paper pulp industry, wherein liquids can be separated from the dry matter of the shredded material. The relatively dry, shredded, and pressed material is then passed via suitable conveying means 34 to a rotary heating unit or chamber 36. The conveying means 34 includes the motor-driven feed mechanism 38 for feeding the shredded and pressed materials at a controlled rate into the rotary heating chamber 36. The material enters the rotary heat chamber 36 at the upstream end 40 moves downstream to be discharged therefrom at the downstream end 42. Hot gases are circulated by means of the recirculation fan 44 from the compartment 46 into the rotary heat chamber 36 at its downstream end 42 for passage countercurrent through the rotary heat chamber 36 and for discharge into the compartment 48 for return to the recirculating fan 44. As will presently be described, the temperature of the recirculated gases is maintained at about 800°F at the downstream end 42 and the gases are circulated so that the shredded material passing through the rotary heat chamber 36 is converted into a charcoal-like material which is deposited in the compartment 46 and is removed therefrom by the motor-driven feed mechanism 50. The latter discharges the fuel to the passageway 52 wherein it is conveyed upward and discharged into the fuel storage chamber 54.

A fluidizing system is operatively associated with the fuel storage chamber 54 for transferring the fuel in a fluidized state to the furnace or combustion chamber 56. The fluidizing system includes a blower 58 which has its suction inlet connected via passageway 60 to the exhaust outlet 62 which is adapted to discharge to the atmosphere. The discharge of the blower 58 is connected to the lower end of the fuel storage chamber 54 for fluidizing the fuel and passing the same via the passageway 64 to the motor-driven feed mechanism 66 for discharging the fuel onto the motor-actuated grates 68 of the stoker burner in the combustion chamber 56. The source of gases for fluidizing the fuel is selected from the cool exhaust gases so as to eliminate the fire hazards which might otherwise occur if oxidizing or hot gases were passed through the fuel in the storage chamber 54. Surplus gases that are passed into the chamber 54 for fluidizing purposes are discharged via the passageway 70 to the exhaust system.

The hot exhaust gases from the combustion chamber 56 are controlled so as to be maintained at about 1500°F. A portion of these gases pass from the furnace via the passageways 72, 74 to chamber 46 of the rotary heat chamber 36. The quantity of such gases which can flow to the rotary heat chamber 36 are controlled by the flow control element 76 in the passageway 74. The flow control element 76 is controlled by motor 78 which is responsive to the temperature-indicating controller 80 which is coupled to the temperature element 82 located adjacent to the downstream end of the rotary heat chamber 36.

Also coupled to the motor 78 is a second flow control element 84 which is in a passageway 86 that is connected at one end to the suction side of the primary air fan 88 that supplies air for combustion purposes to the combustion chamber 56 and at the other end to the outlet of recirculating fan 44. The flow control elements 76 and 84 are set so that the quantity of hot gas make-up that flows at approximately 1500°F to the compartment 46 will be equal to the quantity of gas that is discharged from the upstream end of the rotary heat chamber 36 via the passageway 86 to the combustion chamber 56.

The ventilated collection enclosure 10 is provided with a passageway 90 which passes through the air heater 92 and then to the inlet end of the primary air fan 88 as a source of the primary air for the combustion chamber 56. As previously indicated, one portion of the exhaust gases discharged from the combustion chamber 56 flow to the heat chamber 36 for converting the shredded waste material into a charcoal-like fuel, and the remainder of the hot exhaust gases pass via the passageway 94 through the air heater 92 to the induced draft fan 96 and from there onto the wet scrubber and demister system 98 from where the gases can be discharged to the atmosphere via the exhaust passageway 62. For the purpose of controlling the operation of the stoker feed and thereby the temperature of the exhaust gases, a temperature element 100 is provided in the passageway 74 for the hot make-up gases, and the temperature element is connected to the temperature-indicating controller 102 which in return is operatively coupled to the motor 104 which actuates the stoker. The combustion chamber 56 is also provided with a motor-driven feed mechanism 106 for removing ash from the combustion chamber to a land fill.

It is highly desirable that the exhaust gases from the combustion chamber 56 have a minimum amount of free oxygen that can be available to support combustion, because the exhaust gases subsequently are used to fluidize the relatively hot fuel that is in the fuel storage chamber 54. For this reason an analysis element 108 is provided which is in communication with the exhaust gases passing through the passageway 94, and the analysis element is coupled to the analysis-indicating controller 110 which in turn controls the operation of the motor 112 and the flow control element 114 which is actuated by the motor 112. The analysis element 108 is responsive to the amount of free oxygen in the exhaust passageway 94 and controls the opening through the passageway 90 so as to assure that only a minimum safe amount of free oxygen is discharged to the atmosphere. Thus, the gases that are obtained via the passageway 60 for fluidizing the fuel in the fuel chamber 58 contains a safe and minimal amount of free oxygen assuring complete safety for the system.

A pressure transmitter element 116 is also responsive to the pressures within the exhaust passageway 94, and this element or transmitter is coupled to the pressure-indicating controller 118 which is connected to the motor-driven element 120 for controlling the pressure in the discharge gases, and thereby in combustion chamber 56. This feature is desirable because there is a need to maintain uniform pressures of the gases within the system so that there is stability in the flow of hot make-up gases to the rotary heat chamber 36 and of the gases that are returned therefrom to the combustion chamber 56.

Both the wet scrubber system 98 and the high-density press 32 discharge liquids which must be disposed of without creating pollution problems. For this purpose the liquid from the wet scrubber system 98 is discharged via the conduit 122 and the liquid from the high-density press is discharged via the conduit 124 to the clarifier 126. The effluent from the clarifier is then returned via the pump 128 to the wet scrubber system 98, and a sludge pump 130 removes the sludge from the clarifier and delivers it to the vacuum filter 132. The liquids which are removed from the vacuum filter 132 are discharged to the clarifier at 134, and the filter cakes are discharged at 136 to a land fill. Make-up water for the scrubber system is supplied at 138.

From the foregoing description it will be apparent that a waste-handling system has been provided for disposing of large quantities of combustible waste material, such as garbage and the like, wherein the waste is treated so as to be usable by continuously converting it into fuel, and then using the fuel to supply the energy for converting additional waste material into fuel. The fuel that is formed normally will be used for the purpose of forming additional fuel, but if surpluses are formed, they can be removed from the fuel storage chamber 54 at 140.

Further, the waste-handling system assures that all particulate matter and all malodorous gases are removed from the exhaust gases that are discharged to atmosphere so that the system does not pollute the environment.

It is claimed:

1. A process for disposal of combustible solid waste deposited in an enclosure comprising the steps of shredding the solid waste to obtain shredded material, feeding the shredded material through a high-density press and compressing the same to remove liquids from the material, heating the shredded material in a heating chamber at a temperature of about 800°F for a time sufficient to form a dry charcoal-like fuel, conveying the fuel to a storage chamber, feeding the fuel from the storage chamber to a combustion chamber and incinerating the same at a rate to produce hot gases of about 1500°F, passing a sufficient portion of said hot gases to said heating chamber to maintain at about 800°F the temperature in the heating chamber, and returning a corresponding portion of discharge gases from said heater to said combustion chamber.

2. The process that is defined in claim 1, wherein said enclosure is ventilated, and gases from the ventilated enclosure are discharged into said combustion chamber.

3. The process that is defined in claim 1, wherein the fuel in said storage chamber is fluidized prior to feeding the fuel to the combustion chamber, and the fuel is fed to the combustion chamber in a fluidized state.

4. The process that is defined in claim 3, wherein the fuel in said storage chamber is fluidized by passing cooled exhaust gases from said combustion chamber through said fuel.

5. A process for disposal of combustible solid waste deposited in an enclosure comprising the steps of shredding the solid waste to obtain shredded material, feeding the shredded material through a high-density press and compressing the same to remove liquids from the material, passing the shredded material downstream through a rotary heating chamber in heat transfer relation to hot gases circulated countercurrent to the shredded material to convert the shredded material to a dry charcoal-like fuel conveying the fuel to a storage chamber, fluidizing and feeding fuel from the storage chamber into a combustion chamber and incinerating the same at a rate to produce hot exhaust gases at a temperature of about 1500°F, passing a sufficient portion of said hot exhaust gases to said heating chamber as make-up gases to maintain at about 800°F the temperature of gases in the heating chamber at the downstream end of the shredded material, and returning to said combustion chamber from the upstream end of said shredded material a corresponding portion of discharge gases.

6. The process that is defined in claim 5, including the steps of sensing the temperature of the gases circulating in said heating chamber, and in response to said sensing simultaneously regulating the flow of said make-up gases and said discharge gases so as to maintain said temperature of about 800°F.

7. The process that is defined in claim 5, including the steps of sensing the temperature of said hot exhaust gases, and in response to said sensing regulating the rate of feed of the fuel to maintain said temperature of about 1500°F.

8. The process that is defined in claim 5, including the steps of passing the remaining portion of said hot exhaust gases through a wet scrubber and demister treatment system and then passing the treated gases to atmosphere.

9. The process that is defined in claim 8, wherein the gases used to fluidize the fuel is supplied from the treated exhaust gases prior to the latter being passed to atmosphere.

10. The process that is defined in claim 5, including the steps of ventilating said enclosure, and discharging the gases from the ventilated enclosure into said combustion chamber.

11. The process that is defined in claim 5, including the steps of introducing air into said combustion chamber, sensing the amount of oxygen in the exhaust gases, and in response to said sensing controlling the rate that air is introduced into said combustion chamber.

12. A process for disposal of combustible solid waste deposited in an enclosure comprising the steps of shredding the solid waste to obtain shredded material, feeding the shredded material through a high-density press and compressing the same to remove liquids from the material, passing the shredded material downstream through a heating chamber in heat transfer relation to hot gases circulated countercurrent to the shredded material to convert the shredded material to a charcoal-like fuel, conveying the fuel to a storage chamber, fluidizing and feeding fuel from the storage chamber into a combustion chamber and incinerating the same at a rate to produce hot exhaust gases at a temperature of about 1500°F, passing a sufficient portion of said hot exhaust gases to said heating chamber as make-up gases to maintain at about 800°F the temperature of gases in the heating chamber at the downstream end of the shredded material, returning to said combustion chamber from the upstream end of the shredded material a corresponding portion of discharge gases, ventilating said enclosure, discharging gases from the ventilated enclosure into said combustion chamber as the primary source of air for combustion of said fuel, treating the remainder of said hot exhaust gases to remove particulate matter and to lower the temperature thereof, and returning a portion of the treated gases to said storage chamber for fluidizing the fuel.

13. The process that is defined in claim 12, wherein the gases from said ventilated enclosure are passed in heat transfer relation to said remainder of the hot exhaust gases prior to being discharged into said combustion chamber.

14. A process for disposal of combustible solid waste deposited in an enclosure comprising the steps of shredding the solid waste to obtain shredded material, passing the shredded material downstream through a heating chamber in heat transfer relation to hot gases circulated through the shredded material to convert the shredded material to a charcoal-like fuel, conveying the fuel to a storage chamber, fluidizing and feeding fuel from the storage chamber into a combustion chamber and incinerating the same at a rate to produce hot exhaust gases at a temperature of about 1500°F, passing a sufficient portion of said hot exhaust gases to said heating chamber as make-up gases to maintain at about 800°F the temperature of gases at the downstream end of the shredded material, returning to said combustion chamber from the upstream end of the shredded material a corresponding portion of discharge gases, ventilating said enclosure, and discharging gases from the ventilated enclosure into said combustion chamber as the primary source of air for combustion of said fuel.

15. A process for disposal of combustible solid waste deposited in an enclosure comprising the steps of shredding the solid waste to obtain shredded material, passing the shredded material downstream through a heating chamber in heat transfer relation to hot gases circulated through the shredded material to convert the shredded material to a charcoal-like fuel, conveying the fuel to a storage chamber, fluidizing and feeding fuel from the storage chamber into a combustion chamber and incinerating the same at a rate to produce hot exhaust gases at a temperature of about 1500°F, passing a sufficient portion of said hot exhaust gases to said heating chamber as make-up gases to maintain at about 800°F the temperature of gases at the downstream end of the shredded material, and returning to said combustion chamber from the upstream end of the shredded material a corresponding portion of discharge gases.

* * * * *